US005494715A

United States Patent [19]

Glover

[11] Patent Number: 5,494,715

[45] Date of Patent: Feb. 27, 1996

[54] DECORATIVE MULTIPLE-GLAZED SEALED UNITS

[75] Inventor: Michael Glover, Ottawa, Canada

[73] Assignee: Edgetech I. G. Ltd., Ontario, Canada

[21] Appl. No.: 281,512

[22] Filed: Jul. 28, 1994

[51] Int. Cl.[6] .............................. E06B 3/24; C03C 27/00

[52] U.S. Cl. .......................... 428/34; 428/120; 428/141; 428/194; 428/192; 428/542.2; 156/107; 156/109; 52/786.1

[58] Field of Search .................................. 428/84, 542.2, 428/12, 141, 192, 194; 156/107, 109; 52/288, 290

[56] References Cited

U.S. PATENT DOCUMENTS

| | | | |
|---|---|---|---|
| 49,167 | 8/1865 | Stetson . | |
| 2,132,217 | 3/1937 | Neuendorf | 20/56.5 |
| 2,132,217 | 10/1938 | Neueudorf | 20/56.5 |
| 3,226,903 | 1/1966 | Lillethun | 52/616 |
| 3,308,593 | 3/1967 | Smith | 52/456 |
| 3,308,593 | 3/1967 | Smith | 52/456 |
| 3,512,320 | 5/1970 | Ferron et al. | 52/122 |
| 4,598,520 | 7/1986 | Ellstrom | 52/456 |
| 4,783,938 | 11/1988 | Palmer | 52/171 |
| 4,791,010 | 12/1988 | Hanley et al. | 428/34 |
| 4,997,687 | 3/1991 | Carter | 428/34 |
| 5,271,973 | 12/1993 | Heuther | 428/34 |

FOREIGN PATENT DOCUMENTS

| | | |
|---|---|---|
| 300228 | 8/1924 | Canada . |
| 545330 | 5/1952 | Canada . |
| 793040 | 8/1958 | Canada . |
| 611722 | 1/1961 | Canada . |

*Primary Examiner*—Donald J. Loney
*Attorney, Agent, or Firm*—Wenderoth, Lind & Ponack

[57] ABSTRACT

There is described a multiple-pane sealed glazing unit having two or more parallel glazing sheets which are spaced apart and sealed at the peripheral edges. Incorporated within the unit is a decorative feature comprised of patterns applied to two or more of the glazing sheets and where at least portions of these patterns register with each other and are of sufficient width as to provide the visual appearance of solid members spanning the spacing between at least two of the glazing sheets. In one preferred embodiment, the registering patterns are striped criss-cross patterns and provide the visual appearance of traditional muntin-bar windows. In a second preferred embodiment, the registering patterns are also striped criss-cross patterns and provide the visual appearance of traditional leaded-glass window panels. In a third preferred embodiment, the registering patterns provide the visual appearance of traditional lattice-work, sun-screen panels.

31 Claims, 4 Drawing Sheets

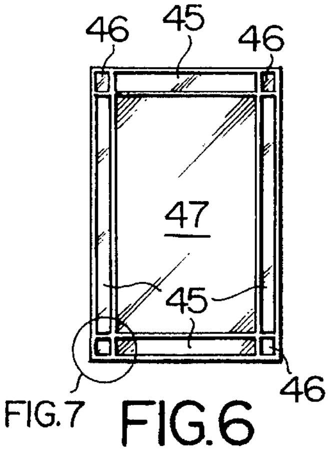
FIG.6
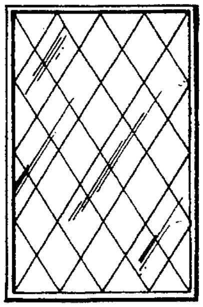
FIG.9
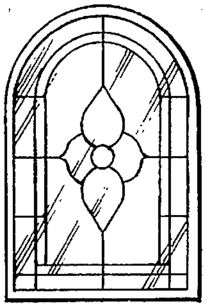
FIG.10
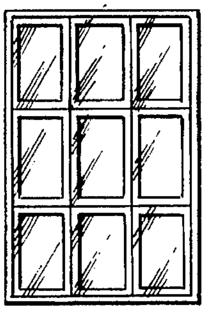
FIG.11
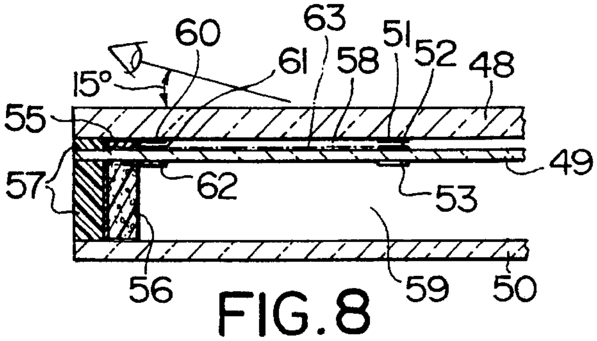
FIG.8
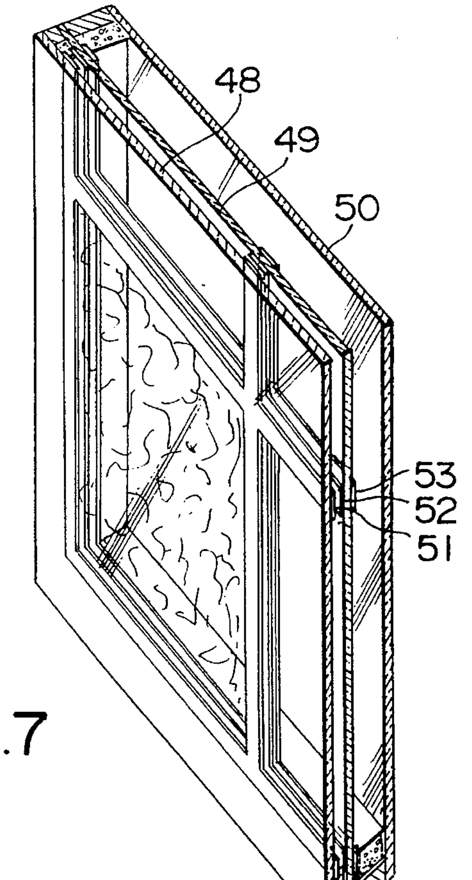
FIG.7
FIG.12
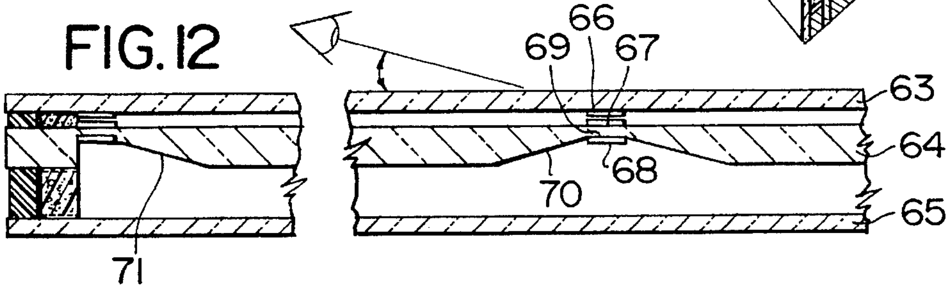

DECORATIVE MULTIPLE-GLAZED SEALED UNITS

FIELD OF INVENTION

This invention relates generally to multiple-pane sealed glazing units and more particularly to units that incorporate decorative features.

DESCRIPTION OF THE PRIOR ART

Multiple-glazed sealed units generally consist of two or more parallel glass panes that are typically spaced apart from each other at the periphery by hollow-profile, desiccant-bead-filled metal spacers and where the outward-facing periphery channels between the spacer and glazing panes are filled with organic sealant material creating a hermetically-sealed glazing cavity.

In recent years, various interrelated efforts have been made to improve the energy-efficiency of these multiple-glazed sealed units. One improvement has been the introduction of low-emissivity (low-e) coatings which help reduce radiation heat loss across the glazing cavity. A second improvement has been the introduction of inert gas filling which helps reduce conductive heat loss across the glazing cavity. A third improvement has been the introduction of insulating spacing-and-desiccant systems which reduce conductive heat loss through the perimeter edge seal. A fourth improvement has been the reintroduction of triple glazing which both reduces radiative and conductive heat loss across the glazing cavity. An additional advantage of triple glazing is that bottom-edge condensation is reduced because the center-glass lite also acts as a convective-flow barrier.

With conventional air-filled units, the optimum glazing-pane spacing for energy efficiency is about ½". However if the units are filled with an inert gas, the glazing spacing can be somewhat reduced without there being a significant loss in energy efficiency. For example to provide the same energy efficiency as air-filled units with conventional ½ inch spacing, the spacing for argon-filled units can be reduced to ⅜ inch and with krypton-filled units, the spacing can be further reduced to 3/16 inch. Particularly for these narrow-gauge, krypton-filled triple units, the advantage of the reduced glazing spacing is that the units can easily fit within existing-window profiles that have been designed for conventional double-glazed units.

As well as the market trend towards increased energy-efficiency, there is also growing consumer interest in decorative heritage features. One popular feature is the addition of muntin bars that simulate the appearance of colonial style, divided-lite windows. A second popular feature is the addition of different types of leaded-came panels, including: beveled-glass, stained-glass and etched-glass assemblies.

Because these heritage-style windows are very labor-intensive to manufacture, various efforts have made to simplify traditional production techniques. In the case of muntin-bar windows, the general approach has been to fabricate the window using a single large glazing unit and to add-on wood or metal devices that create the effect of a divided-lite window. These muntin-bar assemblies can be either clipped-on to one side of the glazing unit, suspended within the glazing cavity, or adhered to either side of the glazing unit with the option of an additional aligned spacer assembly within the glazing cavity.

Although these different types of muntin-bar assemblies simplify the production of divided-lite windows, the add-on devices are still quite labor intensive to produce. In addition, because these muntin-bar assemblies have to be very carefully aligned within the glazing unit, the incorporation of these muntin-bar assemblies slows down the unit production process especially where automated methods are being used.

To further simplify the production of muntin bar windows, the prior art has shown that these various features can be simulated by applying decorative one-dimensional patterns directly onto one of the glass sheets. Canadian Pat No. 793,040 issued to Shelly shows how a decorative muntin-bar assembly can be simulated by printing flat strips on to a glass sheet using a silk-screen process. The Shelly patent also shows how the same process can also be used for simulating a diamond-shaped, leaded-came panel.

An alternative technique for simulating leaded-glass panels is to adhere a flat lead strip to one or even both sides of a glass sheet. However although the use of these tapes simplifies the fabrication of simulated leaded-glass panels, the process is still very labor-intensive. As disclosed in a Canadian patent 349,644 issued to Warga, imitation stained-glass panels can be produced by applying lines of metallic powders to imitate leaded-glass cames and then coloring in between the lines with different pigments and finishes. To produce the final product, the specially-prepared glass sheets are then heated to high temperatures so that the preapplied materials fuse or melt into the glass surface.

As described in U.S. Pat. No. 4,791,010 issued to Hanley et al, when the decorative glass panels are incorporated within a sealed glazing, it is feasible to use simple paint or ink finishes. Specifically, the Hanley patent shows how a decorative etched-glass panel can be simulated by using silk-screen printing in combination with special translucent inks. However in general, these uses of printed decorative patterns have not been successfully commercialized because even though the unit production process is simplified, the visual effects are not particularly impressive as the one-dimensional patterns do not convincingly simulate the heritage features of traditional windows.

SUMMARY OF THE INVENTION

The present invention provides a multiple-pane, sealed glazing unit comprising at least two parallel glazing sheets spaced apart and sealed at the peripheral edges. Incorporated within the unit is a decorative feature comprised of patterns applied to two or more of the glazing sheets and where at least portions of the patterns register with each other and are of sufficient width as to provide the visual appearance of solid members spanning the spacing between at least two of these glazing sheets. In a preferred embodiment, the registering patterns are striped criss-cross patterns.

The patterns are typically located on glazing surfaces that are adjacent to an insulating cavity and consist of a layer of coating material that is bonded to the glazing sheets. The coating layer can be fabricated from a wide range of materials including: inks, paints and enamel frits. The material selected must be essentially non-outgassing and resistant to ultra-violet radiation. Further when bonded to the glazing sheets, the coating material must be machine washable. One suitable material that meets these selection criteria is a UV-curable paint.

Typically, the decorative glazing unit consists of three glazing sheets and although glass is the preferred material, rigid clear plastic sheets or flexible tensioned plastic films can be substituted for the middle glazing sheet. At least two of the glazing sheets are spaced closely together creating one or more narrow cavity spaces and for improved energy efficiency, these narrow cavity spaces can be filled with an inert gas or mixture of inert gases, including argon, krypton, and xenon.

One preferred embodiment of the invention is a triple-glazed unit where the registering patterns provide the visual appearance of a traditional, divided-lite window. The unit consists of three glazing sheets each bearing a striped criss-cross pattern located on a glazing surface adjacent to an insulating surface and where the criss-cross patterns visually divide up the glazing unit into geometrical figures that are typically rectangular in shape.

To provide the visual appearance of a traditional wood muntin-bar profile, the registering portions of the striped criss cross patterns on the middle glazing sheets typically exceed the registering portions of the striped criss-cross patterns on each of the two outer glazing sheets. When viewed from an angle of no less than 15 degrees to the glazing surface, there must be no visible gaps between the three registering striped criss-cross patterns and to match the typical width dimensions of a traditional wood muntin-bar, this requires that the three glazing sheets are spaced not more than a ¼ inch apart.

To provide the visual appearance of a muntin-bar edge frame, a continuous registering striped pattern is located around the perimeter of the glazing sheets and in order to allow for good sealant adhesion, this perimeter stripe pattern is located inwardly from the glazing-sheet edges. Also as a further measure to simulate the visual appearance of a muntin-bar edge frame, the perimeter spacer incorporates a non-reflective front surface that is color coordinated with the striped criss-cross patterns.

A second preferred embodiment of the invention is where the registering patterns provide the visual appearance of a traditional leaded-glass window panel. The unit consists of three glazing sheets with striped criss-cross patterns located on both sides of the middle glazing sheet and also on the cavity side of one of the outer glazing sheets and where the striped criss-cross patterns visually divide up by the unit into geometrical figures. Although a variety of geometrical figures can be formed, one preferred arrangement is a composition of diamond-shaped geometrical figures.

To provide the visual appearance of traditional leaded-came profiles, there must be no visible gaps between the three registering striped criss-cross patterns when viewed from an angle of no less than 15 degrees to the glazing surface. Given the width dimensions of a traditional leaded-glass came, this typically requires that at least two of the glazing sheets are spaced not more than a ⅛ inch apart.

By adding special ornamental features, the appearance of a variety of different types of traditional leaded-glass panels can be provided. One example is where the appearance of a traditional leaded-glass panel is created by applying diagonal criss-cross patterns. A second example is where the appearance of stained-glass is provided by applying translucent colored coating layers between the registering striped criss-cross patterns on the middle glazing surface closely adjacent to the outer glazing sheet. A third example is where the appearance of a decorative leaded-glass border is provided by only locating the registering striped criss-cross patterns in a perimeter band around the glazing unit. A fourth example is where the appearance of a bevelled leaded-glass unit is provided by locating the registering striped criss-cross patterns on both sides of chamfered grooves incorporated within the middle glazing sheet.

A third preferred embodiment of the invention is where the registering patterns are also striped criss-cross patterns and provide the appearance of traditional lattice-work, sun-screen panels.

The present invention further provides a method of fabricating multiple-pane, sealed glazing units incorporating decorative features. This method comprises the following four main steps: (a) providing three flat glazing sheets of similar size; (b) applying a pattern of desired configuration to one or more of the flat surfaces of at least two of the glazing sheets; (c) arranging the glazing sheets in an overlapping spaced relationship so that at least portions of the patterns will be in register in the completed glazing unit, and (d) sealing the peripheral edges of said glazing sheets.

In applying the patterns to the flat surface of a glazing sheet, a number of techniques can be used, including: electronic air brush printing; ink-jet printing, off-set printing and silk-screen printing. For fast high volume printing of a criss-cross striped pattern one preferred method involves printing a number of parallel decorative stripes in one direction and then at a predetermined direction to the first, printing a number of parallel decorative stripes in a different direction.

BRIEF DESCRIPTION OF THE DRAWINGS

The following is a description by way of example of certain embodiments of the present invention, reference being made in the accompanying drawings, in which:

FIG. 6 shows an elevation view of a triple-glazed unit incorporating a simulated decorative leaded-glass edge.

FIG. 7 shows a fragmentary perspective view indicated by a circle in FIG. 6 of a triple-glazed unit incorporating a portion of a simulated decorative leaded-glass edge.

FIG. 8 shows a cross-section view of a triple-glazed unit incorporating a simulated decorative leaded-glass edge.

FIG. 9 shows an elevation view of a triple-glazed unit incorporating a simulated diamond-shaped, leaded-glass panel.

FIG. 10 shows an elevation view of a triple-glazed unit incorporating a simulated decorative stained-glass panel.

FIG. 11 shows an elevation view of a triple-glazed unit incorporating a simulated beveled leaded-glass panel.

FIG. 12 shows a cross-section of a triple-glazed unit incorporating a simulated beveled leaded-glass panel.

DETAILED DESCRIPTION OF DRAWINGS

Figure 1:
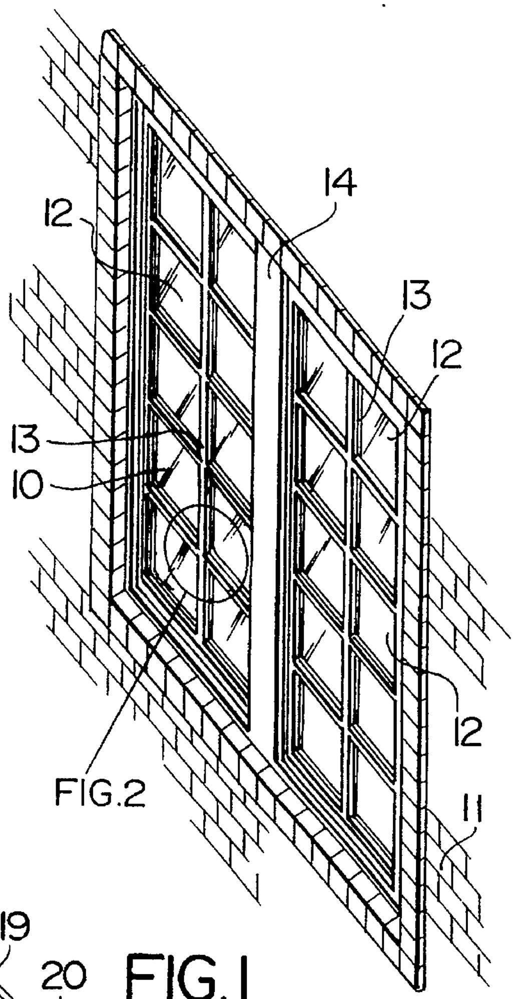
FIG. 1 shows a fragmentary perspective view of a building wall incorporating a simulated muntin-bar window.

Referring to the drawings, FIG. 1 shows a perspective view of a window 10 installed within a building wall 11 and incorporating a triple-glazed, sealed unit 12 conventionally installed within a window frame 14. The triple-glazed sealed units 12 include the decorative feature of a simulated muntin-bar assembly 13.

Figure 2:
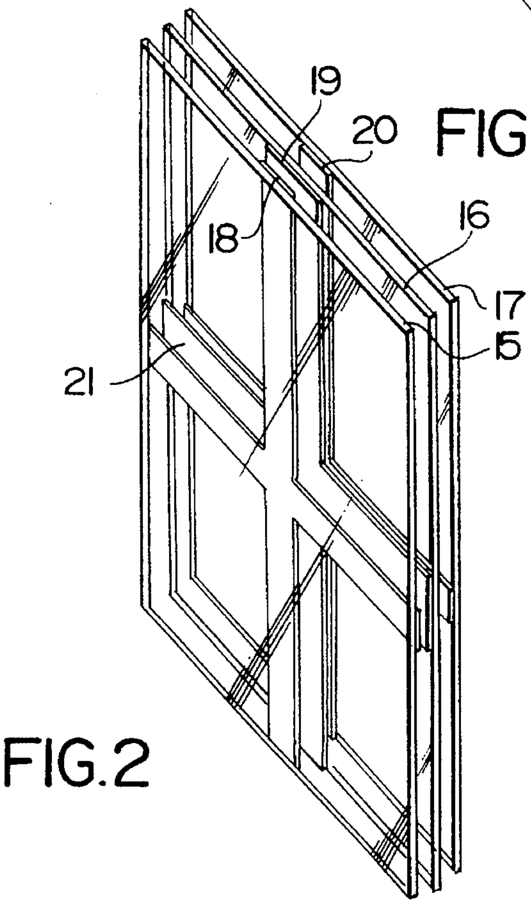
FIG. 2 shows to a larger scale a fragmentary perspective view of a portion of a simulated muntin-bar window indicated by a circle in FIG. 1.

FIG. 2 shows to a larger scale a fragmentary perspective view of a portion of a simulated muntin-bar window indicated by a circle in FIG. 1. The sealed unit is fabricated from three glazing sheets 15, 16, and 17 that are narrowly spaced apart and conventionally sealed at the perimeter edge. A decorative pattern is applied to each of the three glazing sheets, 15, 16, and 17 and this pattern takes the form of criss-cross stripes 18, 19, and 20 that typically divide up the glazing unit into rectangular areas. For the outer and inner glazing sheets 15 and 17, the width of the stripes 18 and 20, is essentially the same, but for the center glazing sheet 16, the width of the stripe 19 is somewhat larger than the outer two.

Specifically when viewed from an oblique angle, the three separate stripes 18, 19, and 20 create the visual appearance of a solid muntin-bar assembly. Under daylight conditions, this visual appearance is further enhanced as the exterior glass stripe 20 is somewhat brighter than the edge zone 21 of the center glass stripe 19 which in turn is somewhat brighter than the interior stripe 18. As with traditional wood-window profile designs, this graduated effect also helps to eliminate any visual glare problems that may occur under bright sunny conditions.

Figure 3:
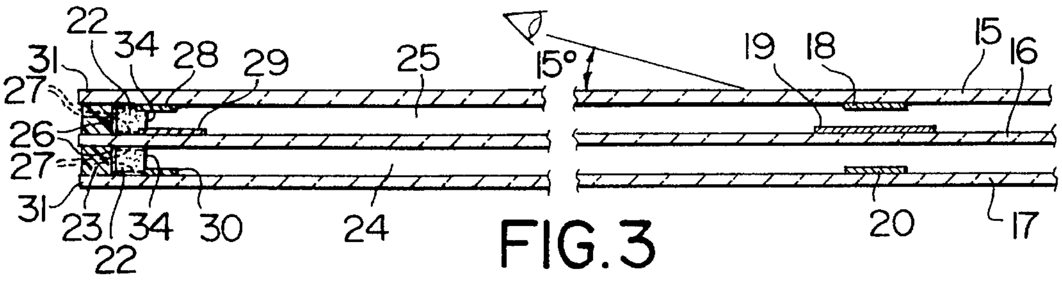
FIG. 3 shows a cross-section view of a narrow-gauge, triple-glazed unit incorporating simulated muntin bars.

FIG. 3 shows a cross-section through a narrow-gauge, triple-glazed unit that incorporates both the decorative features of a simulated muntin bar assembly and a simulated muntin-bar edge frame. The glazing unit consists of three rigid glazing sheets 15, 16 and 17 which are typically made from glass. The glazing sheets are spaced apart by spacers 22 and organic sealant material 23 is applied in the outward peripheral channels formed between the glazing sheets 15, 16 and 17 and the edge spacers 22. The three glazing sheets enclose two narrow glazing cavities 24 and 25 which are typically filled with an inert gas.

Incorporated within the unit is a decorative feature comprised of three stripes 18, 19 and 20 which are applied to the three glazing sheets. In assembling the unit, the outer stripes 18 and 20 are aligned while the wider center stripe 19 is centered on the two outer narrower stripes.

To protect the stripes from material degradation, two of the stripes 18 and 20 are located on the cavity side of the outer glazing sheets 15 and 17 while the third stripe 19 is typically located on the building interior side of the middle glazing sheet 16.

The three stripes 18, 19 and 20 consist of a thin layer of coating material bonded to the glazing sheets 15, 16 and 17 and it should be noted that for reasons of graphic legibility, the thickness of this coating layer is exaggerated in the cross-sectional drawing.

The coating layer can be fabricated from a variety of different materials including; paint, ink, and enamel frit. The material selected must be essentially non-outgassing and resistant to ultra-violet radiation. Further when bonded to the glazing sheets, the coating material must be machine washable using standard equipment. One suitable material that meets these selection criteria is a UV-curable paint.

To simulate traditional slim-line, muntin-bars for small residential divided-lite panes, the outer stripes 18 and 20 are typically about ⅜ inch in width while the middle stripe 19 is typically about ¾ inch in width. To provide the visual appearance of a solid muntin bar, it is important that when viewed from an angle of no less than fifteen degrees to the glazing surface, there are no visible gaps between the three stripes and so given the stated typical dimensions of the three stripes, this requires that the three glazing sheets are spaced less than a ¼" apart.

For improved energy efficiency, the two narrow cavity spaces 24 and 25 can be filled with an inert gas or mixtures of different inert gases including: argon, krypton and xenon and specifically for a ¼" cavity space, krypton provides the optimum performance.

Although the specific example of a simulated muntin-bar assembly illustrated in FIG. 3 consists of a simple three-strip combination, it will be apparent to those skilled-in-the-art that more intricate profiles can be simulated by varying different aspects of the glazing assembly. These options include: (i) varying the width of the stripes; (ii) changing the spacing between the glazing sheets; (iii) adding a fourth stripe on the other side of the middle glazing sheet; (iv) adding a fourth glazing sheet with additional applied stripes, (v) fabricating the stripes with an opaque center core and outer translucent bands, and (vi) fabricating the stripes from a combination of applied dots or half-tone patterns.

As illustrated in FIG. 3, the perimeter edge seal incorporates a desiccant-filled, silicone foam spacer 22 with a preapplied pressure-sensitive adhesive 27 on the spacer sides and backed with a vapor barrier 26. The outward facing channels at the perimeter edge are filled with conventional organic sealant material 23.

To provide visual continuity and simulate the three dimensional appearance of muntin bars at the perimeter edge, three flat stripes 28, 29 and 30 are applied to the glazing sheets 15, 16 and 17 and these edge stripes are typically half the width of the center glazing stripes 18, 19 and 20. To ensure good sealant adhesion, the stripes are terminated at a short distance away from the glazing edge 31. As illustrated in FIG. 3, the preferred spacer system for this application is a desiccant-filled, silicone foam spacer and this system offers four key advantages. First, the silicone-foam spacer can be easily fabricated in the very slim spacer widths required for narrow-gauge triples. Second, visual continuity is enhanced as the front-face surface finish 34 of the silicone-foam spacer is non-reflective and also easily color coordinated with the three applied perimeter-edge stripes 28, 29 and 30. Third without adversely effecting the long-term durability of the edge seal, the silicone foam spacer with its adhesive seal can be laid directly on top of the edge stripes and again by the edge spacer overlapping the three edge stripes 28, 29 and 30, the visual continuity is enhanced. Fourth, the spacer with its pressure-sensitive side adhesive 27 facilitates the use of sophisticated accurate automated production equipment and for both spacer application and glass matching, this accuracy is critical if the three stripes are to be correctly aligned.

Figure 4:
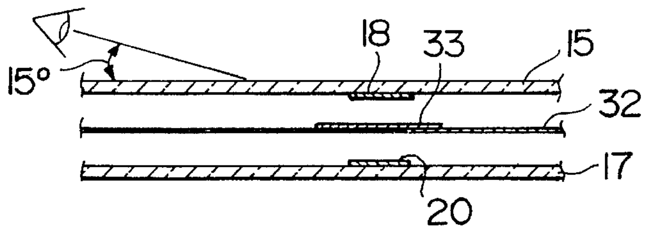
FIG. 4 shows a cross-section view of a narrow-gauge, triple-glazed unit incorporating both simulated muntin bars and a flexible tensioned, center-glazing film.

Although typically the glazing unit consists of three rigid glazing sheets, one option that is illustrated in FIG. 4 is to substitute a plastic flexible, tensioned film 32 for the middle glazing sheet. Because the film is flexible, the key advantage is that it is easier to apply the striped pattern 33 using conventional printing techniques.

A variety of different techniques can be used for applying the striped criss-cross patterns to the glazing sheets. For example, where a large number of similar size units have to be fabricated at the same time, conventional silk-screen printing can be cost-effectively used. However where a large variety of different size units have to be fabricated, more flexible production methods are needed.

In the case of complicated curved or shaped designs, it is recommended that large format, electronic printing systems are used. For example, one suitable system is the Jumbo-Printer (Trademark) system available from Sign-Tronic/Luscher and this system electronically air-brushes decorative patterns directly on glass sheets, even large glass sheets up to a maximum size of 6 ft×6 ft. Other large-format, electronic printing systems can also be used, including special automated ink-jet systems.

However today's commercially-available, large-format electronic printing systems are generally quite slow and so for high volume unit production of different size units, it is recommended that a series of printing devices are used to individually apply the separate muntin-bar stripes to the glazing sheets. This type of high volume production process is illustrated in FIG. 5 where using an automated conveying system 38, a glazing sheet 35 is fed through a special printing system 36 that applies parallel stripes 37 at the required spacing. The glazing sheet 39 then stops and exits on a second conveying system 43 at right angles to the first. The glazing sheet 40 is then again fed through a special printing system 41 that applies a second set of parallel stripes 42 at the required spacing.

Figure 5A:
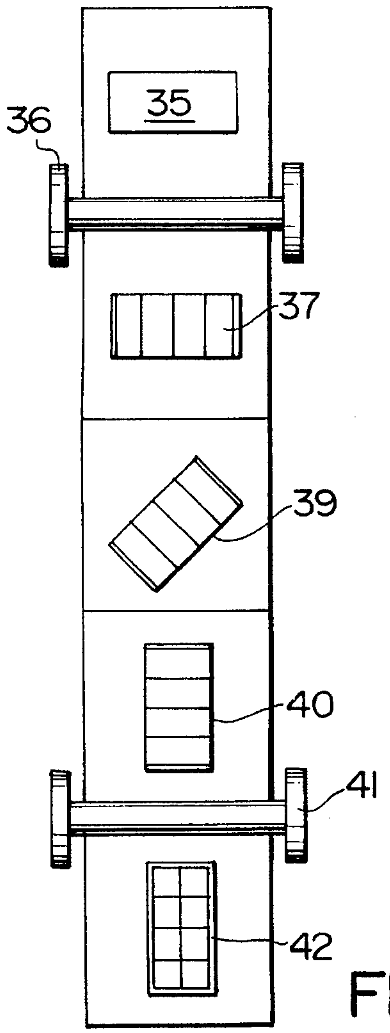
FIG. 5A shows an alternative equipment layout for applying the decorative criss-cross patterns.
Figure 5:
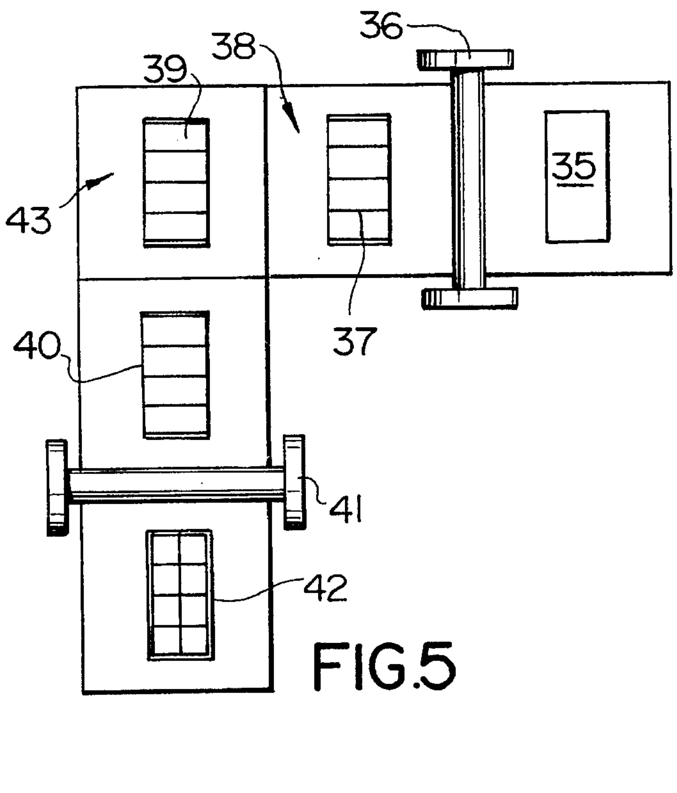
FIG. 5 shows for a high volume production line, the main steps in applying the decorative criss-cross patterns.

Rather than incorporate a right-angled turn in the glass conveying-line, an alternative production procedure is illustrated in FIG. 5A where after the first printing system 36, the glazing sheet 39 is rotated through 90 degrees before proceeding to the second printing system 41.

The special printing systems 36 and 41 consist of a series of separate printing devices that can be automatically adjusted to allow for different stripe spacings. For these individual printing devices, a number of different printing systems can be used, including ink-jet as well as conventional off-set printing systems.

FIG. 6 shows an elevation view of a triple-glazed unit featuring a simulated decorative leaded-glass border. The simulated stained-glass portions of the perimeter and corner panels 45 and 46 are colored while the center-glazing panel 47 is clear.

FIG. 7 shows to a larger scale, a fragmentary perspective view of a portion of a simulated leaded-came glazing border indicated by a circle in FIG. 6. The sealed unit is fabricated from three glazing sheets 48, 49 and 50 that are asymmetrically spaced apart and sealed at the perimeter edge. Two of the glazing sheets 48 and 49 are typically spaced no more than a ⅛ inch apart, while the other two glazing sheets 49 and 50 are typically spaced about ½ inch apart. A decorative pattern is applied to each of the glazing sheets 48 and 49 and this pattern typically takes the form of criss-cross stripes that divide up the glazing into rectangular shapes. The decorative strips 51, 52 and 53 are applied to both sides of the middle glazing sheet 49 and to cavity side of the glazing sheet 48. Specifically when viewed at an oblique angle, the three stripes 51, 52 and 53 create the visual illusion of a solid lead-came assembly.

FIG. 8 shows a cross-section through a triple-glazed unit that incorporates both the decorative features of a simulated lead-came glazing panel assembly and a simulated lead-came glazing edge. The glazing unit consists of three glazing sheets 48, 49 and 50 which are typically made from glass. The glazing sheets are spaced apart by spacers 55 and 56 and organic sealant material 57 is applied in the outward peripheral channels formed between the glazing sheets 48, 49 and 50 and the edge spacers 55 and 56. The three glazing sheets enclose two glazing cavities 58 and 59.

Incorporated within the unit is a decorative feature comprised of three aligned criss-crossed stripes 51, 52 and 53 which are applied to the three glazing sheets 48, 49, and 50. The three aligned stripes 51, 52 and 53 are typically the same size but an optional feature is for the center stripe 52 to be slightly larger than the two outer stripes 51 and 53.

As with the previous example of muntin bars, the three stripes 51, 52 and 53 consist of a thin layer of coating material bonded to the two glazing sheets 48 and 49. The stripes are also fabricated in the same way as the muntin-bar stripes but to provide the appearance of a traditional metal came, the stripes 51, 52 and 53 are typically colored a lead gray or brass color.

To provide the three-dimensional appearance of a solid lead came, it is important that when viewed from an angle of not less than fifteen degrees to the glazing surface, there are no visible gaps between the three stripes. Given that for a small glass pane, the typical width dimension of a lead came is about ¼ inch, this requires that the outer glazing sheet 48 and the middle glazing sheet 49 are spaced less than a ⅛ inch apart. The spacing of about an ⅛ inch is also appropriate as this dimension is about the typical depth dimension of a traditional lead came.

For improved energy efficiency, the very narrow cavity space 58 between glazing sheets 48 and 49 can be filled with an inert gas and for optimum performance, xenon is recommended.

To protect the stripes from material degradation, one of the stripes 51 is located on the cavity side of one of the outer glazing sheets 48 while the other two stripes 51 and 53 are located either side of the middle glazing sheet 49.

As with the simulated muntin-bar unit, the same edge-seal system is also employed and as illustrated in FIG. 8, a particular advantage of using a desiccant-filled silicone foam spacer 55 is that the spacer can be manufactured in ⅛ inch widths or less. To simulate the perimeter appearance of a leaded-glass came, three perimeter stripes 60, 61 and 62 are applied to the glazing sheets 48, 49, and 50 and these perimeter stripes are typically the same size as the center glazing stripes 51, 52 and 53. To further enhance visual continuity at the perimeter edge, the front face of the spacer 55 is color coordinated with the perimeter stripes 60, 61 and 62 but the front face of the spacer 56 is typically a different color.

To simulate the colored appearance of stained glass, the portion of the glazing surface area between the glazing stripes 51, 52 and 53 and the perimeter stripes 60, 61 and 62 is coated with a translucent layer of paint or ink 63 that is indicated by a dotted line on the middle glazing sheet 49. This translucent coating 63 is made of similar materials and fabricated in a similar way to the decorative opaque stripes that simulate the leaded cames.

Although the specific example of a simulated leaded-glass border panel is a simple decorative feature it will be apparent to those skilled-in-the-art that more complicated and elaborate decorative leaded-glass features can be simulated. FIG. 9 shows an elevation view of a triple-glazed unit incorporating a simulated diamond-shaped, leaded-glass panel. FIG. 10 shows an elevation view of a triple-glazed unit incorporating a simulated decorative stained-glass panel. FIG. 11 shows an elevation view of a triple-glazed unit incorporating a simulated bevelled leaded-glass panel.

FIG. 12 shows a cross-section through a triple-glazed unit incorporating a simulated bevelled glass lead-came assembly. The glazing unit consists of three rigid glazing sheets 63, 64 and 65 which are typically made from glass. Using automated equipment, a chamfered beveled channel 70 is ground into the thick middle-glazing sheet 64. A decorative printed stripe 68 is located in the flat center of the groove 69. Additional stripes 66 and 67 are applied to the other side of the middle glazing sheet 64 and the outer glazing sheet 66 and all three stripes 66, 67 and 68 are appropriately aligned so that when viewed from an oblique angle, the appearance is created of a solid lead-came assembly.

The middle glazing sheet 64 also incorporates a half-chamfered beveled channel 71 at the perimeter edge. The center and perimeter-glass channels 70 and 71 create a rectangular arrangement of chamfered channels and by aligning the three stripes 66, 67 and 68 with these channels, the appearance is created of a traditional bevelled leaded-glass panel.

Although only two specific examples of simulated decorative features have been described and where both these examples, wood muntin-bars and leaded glass cames are based on traditional heritage features of North American and European windows, it will be apparent to those skilled-in-the-art that other architectural styles and decorative features can be simulated in a similar manner. These decorative features can incorporate transparent, translucent or opaque patterns, or a combination of these different effects.

Figure 13:
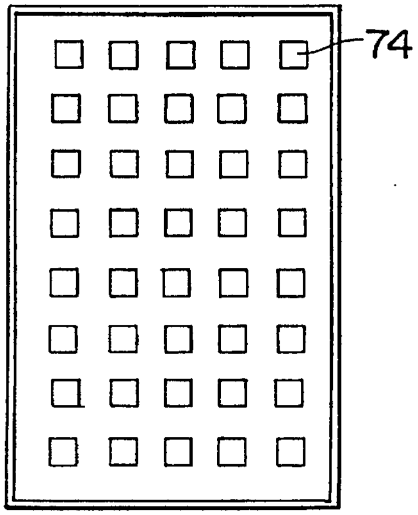
FIG. 13 shows an elevation view of a triple-glazed unit incorporating a simulated lattice-work panel.

FIG. 13 shows an elevation view of a triple-glazing unit incorporating a simulated lattice-work panel incorporating clear glass squares 74. Traditionally, these lattice-work panels were fabricated from various materials including wood and clay tiles and in hot climate countries, the purpose of these panels was to prevent excessive summer-time solar-gains from entering the building.

Figure 14:
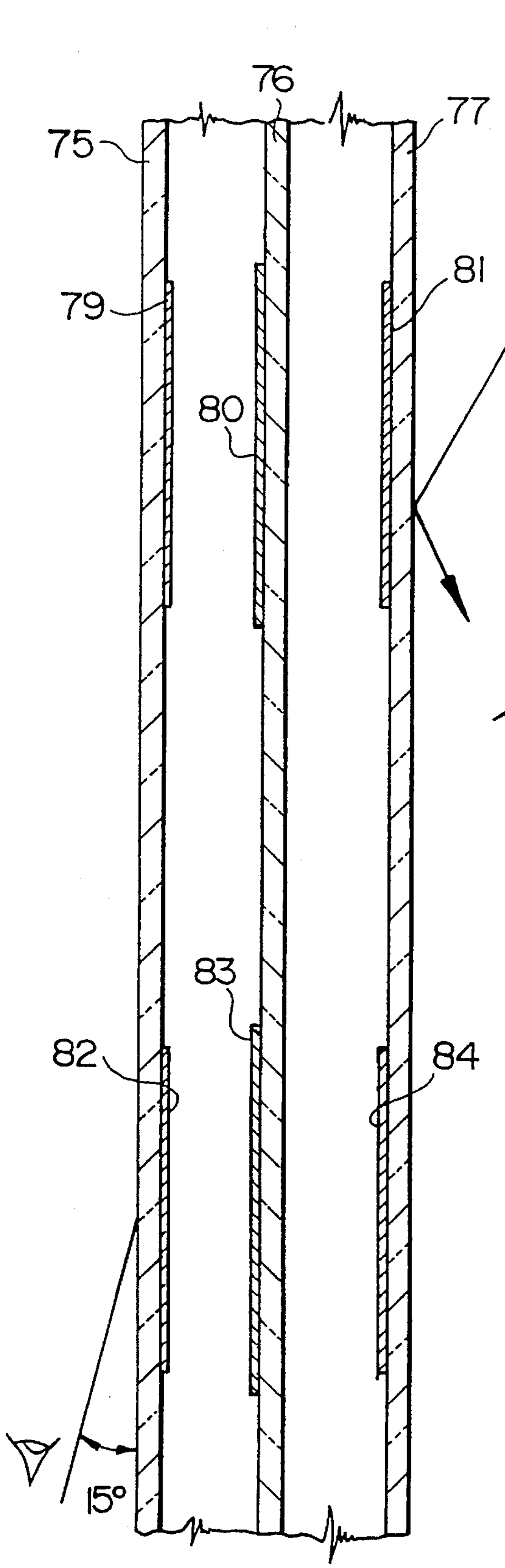
FIG. 14 shows a cross-section of a triple-glazed unit incorporating a simulated lattice-work panel.

FIG. 14 shows a cross-section through a triple-glazed unit incorporating a simulated lattice-work panel. The glazing unit consists of three glazing sheets 75, 76 and 77 which are conventionally spaced apart and sealed at perimeter edge. A decorative pattern is applied to each of the glazing sheets 75, 76 and 77, and this pattern takes the form of criss-cross stripes 79, 80 and 81 that divide up the glazing unit into small rectangular areas of clear glass. Specifically when viewed from an oblique angle, these criss-cross stripes create the visual appearance of a solid lattice-work panel and to maintain this visual illusion, it is important when viewed from an angle of no less than 15 degrees to the glazing surface, there are no visual gaps between the three striped criss-cross patterns 79, 80 and 81. Assuming that the width of three stripes is about two inches, this allows the glazing sheets 75, 76 and 76 to be conventionally spaced apart by about ⅝ inch.

As with traditional lattice-work, a south-facing glazing panel can serve as sun-screen and if excess summer-time solar gains 85 are to be avoided, the spacing between the two sets of wide horizontal stripes 79, 80, 81 and 82, 83, 84 should be about two inches. However in the winter months, the horizontal decorative stripes do not reflect the solar gains 86 and so useful solar heat can still enter the building.

I claim:

1. A sealed multiple-pane glazing unit comprising:

two spaced apart, parallel glazing sheets having peripheral edges that are sealed together to define between said glazing sheets at least one insulating cavity;

a first surface pattern provided on a surface of a first of said two glazing sheets and in said at least one insulating cavity;

a second surface pattern provided on a surface of a second of said two glazing sheets and in said at least one insulating cavity;

wherein at least portions of said first and second surface patterns are in register with one another; and wherein said first surface pattern is discrete from said second surface pattern and is spaced apart from said second surface pattern in a direction normal to said glazing sheets.

2. A sealed multiple-pane glazing unit as recited in claim 1, wherein said first and second surface patterns comprise a means for providing a visual appearance of at least one solid member spanning an entirety of the spacing between said first and second glazing sheets when viewed from outside said glazing unit from an angle of at least 15 degrees relative to an outer surface of said glazing unit.

3. A sealed multiple-pane glazing unit as recited in claim 1, wherein said first and second surface patterns comprise layers of coating material bonded to said surfaces of said first and second glazing sheets, respectively.

4. A sealed multiple-pane glazing unit as recited in claim 3, wherein said coating material is selected from among the group consisting of inks, paints and enamel frits.

5. A sealed multiple-pane glazing unit as recited in claim 3, wherein said layers of coating material are non-outgassing and resistant to ultra-violet radiation.

6. A sealed multiple-pane glazing unit as recited in claim 3, wherein said coating material comprises a UV-curable paint.

7. A sealed multiple-pane glazing unit as recited in claim 1, wherein said at least one insulating cavity is filled with inert gas.

8. A sealed multiple-pane glazing unit as recited in claim 1, wherein said two glazing sheets are spaced apart by not more than ¼ inch.

9. A sealed multiple-pane glazing unit as recited in claim 1, further comprising a non-reflective edge spacer spanning between said two glazing sheets adjacent peripheries thereof; and wherein said first and second surface patterns are in continuous register with one another and are spaced inwardly from said peripheries of said glazing sheets and, together with said edge spacer, comprise means for simulating a muntin-bar edge frame.

10. A sealed multiple-pane glazing unit comprising:

three spaced apart, parallel glazing sheets having peripheral edges that are sealed together to define at least one insulating cavity;

first, second and third surface patterns respectively provided on three different surfaces of said three glazing sheets;

wherein at least portions of said first, second and third surface patterns are in register with one another; and wherein said first, second and third surface patterns are discrete from one another and are spaced apart from one another in a direction normal to said glazing sheets.

11. A sealed multiple-pane glazing unit as recited in claim 10, wherein said first, second and third surface patterns comprise a means for providing a visual appearance of at least one solid member spanning an entirety of the spacing between the two outermost ones of said first, second and third glazing sheets when viewed from outside said glazing unit from an angle of at least 15 degrees relative to an outer surface of said glazing unit.

12. A sealed multiple-pane glazing unit as recited in claim 10, wherein said first, second and third surface patterns are disposed in said at least one insulating cavity.

13. A sealed multiple-pane glazing unit as recited in claim 10, wherein said first, second and third patterns comprise layers of coating material respectively bonded to said three different surfaces of said first, second and third glazing sheets.

14. A sealed multiple-pane glazing unit as recited in claim 13, wherein said coating material is selected from among the group consisting of inks, paints and enamel frits.

15. A sealed multiple-pane glazing unit as recited in claim 13, wherein said layers of coating material are non-outgassing and resistant to ultra-violet radiation.

16. A sealed multiple-pane glazing unit as recited in claim 13, wherein said coating material comprises a UV-curable paint.

17. A sealed multiple-pane glazing unit as recited in claim 10, wherein said first, second and third glazing sheets comprise a middle sheet and two outer sheets; and said middle sheet comprises a flexible tensioned plastic film.

18. A sealed multiple-pane glazing unit as recited in claim 10, wherein said at least one insulating cavity is filled with inert gas.

19. A sealed multiple-pane glazing unit as recited in claim 10, wherein said first, second and third surface patterns comprise a middle surface pattern and two outer surface patterns; and said middle surface pattern is wider than said two outer surface patterns.

20. A sealed multiple-pane glazing unit as recited in claim 10, wherein said first, second and third glazing sheets are spaced apart by not more than ¼ inch.

21. A sealed multiple-pane glazing unit as recited in claim 10, further comprising a non-reflective edge spacer spanning between each adjacent pair of said glazing sheets adjacent peripheries thereof; and wherein said first, second and third surface patterns are in continuous register with one another and are spaced inwardly from said peripheries of said glazing sheets and, together with said edge spacers, comprise means for simulating a muntin-bar edge frame.

22. A sealed multiple-pane glazing unit as recited in claim 10, wherein said first, second and third glazing sheets comprise a middle sheet and two outer sheets;

said first surface pattern is provided on an inside surface of one of said two outer sheets;

said second and third surface patterns are respectively provided on opposing surfaces of said middle sheet; and said first, second and third surface patterns comprise criss-cross patterns and together comprise a means for simulating a pattern of a leaded-glass panel which delineates geometrical figures.

23. A sealed multiple-pane glazing unit as recited in claim 22, wherein at least two of said glazing sheets are spaced part by not more than ⅛ inch.

24. A sealed multiple-pane glazing unit as recited in claim 22, further comprising a translucent colored coating layer provided on the surface of said middle sheet facing the one of said outer sheets having said first surface pattern thereon, in a location corresponding to at least one of said geometrical figures, so as comprise a means for simulating a stained-glass panel.

25. A sealed multiple-pane glazing unit as recited in claim 22, wherein said middle sheet has a chamfered groove therein; and said surface patterns are located on both sides of said chamfered groove for simulating a beveled leaded-glass panel.

26. A method of fabricating a sealed multiple-pane glazing unit, said method comprising:

providing two glazing sheets of similar size;

applying a first surface pattern on a surface of a first of said two glazing sheets;

applying a second surface pattern, discrete from said first surface pattern, on a surface of a second of said two glazing sheets;

arranging said two glazing sheets in an overlapping spaced relationship so that said first and second surface patterns are disposed between said two glazing sheets and are spaced apart from one another in a direction normal to said glazing sheets, and so that at least portions of said first and second surface patterns are in register with one another; and sealing peripheral edges of said two glazing sheets to define at least one insulating cavity.

27. A method as recited in claim 26, wherein said patterns are applied using a technique selected from the group consisting of electronic air brush printing, ink-jet printing, off-set printing and silk-screen printing.

28. A method of fabricating a sealed multiple-pane glazing unit, said method comprising:

providing three glazing sheets of similar size;

applying first and second discrete surface patterns on two different surfaces, respectively, of said three glazing sheets;

arranging said three glazing sheets in an overlapping spaced relationship so that said two glazing sheets are spaced apart from one another in a direction normal to said glazing sheets, and so that at least portions of said first and second surface patterns are in register with one another; and sealing peripheral edges of said three glazing sheets to define at least one insulating cavity.

29. A method of fabricating a sealed multiple-pane glazing unit as recited in claim 28, wherein in arranging said three glazing sheets, said glazing sheets are arranged such that said first and second surface patterns are disposed in said at least one insulating cavity after sealing of said peripheral edges.

30. A method of fabricating a sealed multiple-pane glazing unit as recited in claim 28, further comprising applying a third surface pattern on a surface of one of said three glazing sheets other than the surfaces on which said first and second surface patterns are applied.

31. A method as recited in claim 28, wherein said patterns are applied using a technique selected from the group consisting of electronic air brush printing, ink-jet printing, off-set printing and silk-screen printing.

* * * * *